US007386619B1

(12) United States Patent
Jacobson et al.

(10) Patent No.: US 7,386,619 B1
(45) Date of Patent: Jun. 10, 2008

(54) SYSTEM AND METHOD FOR ALLOCATING COMMUNICATIONS TO PROCESSORS IN A MULTIPROCESSOR SYSTEM

(75) Inventors: Van Jacobson, Woodside, CA (US); Bob Felderman, Portola Valley, CA (US); Archibald L Cobbs, San Carlos, CA (US); Martin Eberhard, Woodside, CA (US)

(73) Assignee: SLT Logic, LLC, Boston, MA (US)

( * ) Notice: Subject to any disclaimer, the term of this patent is extended or adjusted under 35 U.S.C. 154(b) by 868 days.

(21) Appl. No.: 10/337,177

(22) Filed: Jan. 6, 2003

(51) Int. Cl.
*G06F 15/16* (2006.01)
*G06F 3/00* (2006.01)
*G06F 15/00* (2006.01)

(52) U.S. Cl. .......................... 709/229; 709/201; 710/1; 710/2; 710/3; 710/4; 710/5; 710/52; 712/1; 712/28

(58) Field of Classification Search ................ 709/201, 709/229; 710/1–5, 52; 712/1, 28
See application file for complete search history.

(56) References Cited

U.S. PATENT DOCUMENTS

| 4,622,633 | A  | * | 11/1986 | Ceccon et al. ............... 713/1 |
| 6,189,065 | B1 | * | 2/2001  | Arndt et al. ................ 710/260 |
| 2003/0046464 | A1 | * | 3/2003 | Murty et al. ................ 710/260 |
| 2004/0062245 | A1 | * | 4/2004 | Sharp et al. ................ 370/392 |

OTHER PUBLICATIONS

Salim, Jamal H., Robert Olsson, Alexey Kuznetsov. "Beyond Softnet". *Proceedings of the 5th Annual Linux Showcase & Conference*. Nov. 5-10, 2001. pp. 165-172. Oakland, CA.

* cited by examiner

*Primary Examiner*—Nathan Flynn
*Assistant Examiner*—Joshua Joo
(74) *Attorney, Agent, or Firm*—Patterson, Thuente, Skaar & Christensen

(57) ABSTRACT

In a multiprocessor-system, a system and method assigns communications to processors, processes, or subsets of types of communications to be processed by a specific processor without using a locking mechanism specific to the resources required for assignment.

5 Claims, 3 Drawing Sheets

SYSTEM AND METHOD FOR ALLOCATING COMMUNICATIONS TO PROCESSORS IN A MULTIPROCESSOR SYSTEM

FIELD OF THE INVENTION

The present invention is related to computer software and more specifically to computer software for processing communications received by a multiprocessor computer system.

BACKGROUND OF THE INVENTION

Computer systems can process communications from sources and provide responses. In a multiprocessor system, one or more network interface cards (NICs) receive communications, and drive an interrupt signal to one or more of the processors to indicate that a communication has been received. The interrupt resolution system in the computer system allows a driver in one of the processors to respond to the interrupt, so that the communication can be processed and a response may be generated. Because the processors may share the processing of interrupts, the processor containing the driver that responds to the interrupt for a communication received from one source may not be the processor that had responded to the interrupt for a prior communication received from that same source.

If the process that ultimately processes the communication requires state information from a prior communication, in the event that the same processor processed the prior communication, the state information may be in the processor's cache. The processing of the communication and the generation of the response in this event is quick and efficient, although in an n-multiprocessor system, such efficient processing may only occur 1/n of the time. The remainder of the time, the prior command was processed by a different process or on a different processor, and so the current state information from the prior communications will not be in the cache of the processor that processes the current communication. If, however, a different one of the processors processed the prior communication, the processor responding to the interrupt and processing the subsequent communication must retrieve the state information from memory or disk, adding time to process the communication and produce a response and reducing the throughput of the system. Such inefficient processing occurs (n−1)/n of the time. As n grows to a larger number, the processing efficiency of the system decreases and the average response time increases.

Other systems have the potential to improve the efficiency and response time of such systems, but can require complex contention management systems for the routing of messages to prevent the simultaneous access of queues or other resources by different processors, and if the other systems are implemented in hardware, can add hardware costs to the multiprocessor system.

What is needed is a system and method that can speed the processing and response to communications in a multiprocessor system without requiring any additional contention management systems and without adding hardware costs to the system.

SUMMARY OF INVENTION

A system and method uses a set of criteria and/or rules to assign communications to a processor, a process, or a type of communications on a processor, in a multiprocessor system. The criteria and/or rules may be preloaded at system startup, received from one or more processes during system operation, or both. The criteria and/or rules help ensure that any context information from prior communications that may be useful in processing the communication will be in the processor cache of the processor that processes each communication, speeding the processing of that communication without a special contention management system.

DETAILED DESCRIPTION OF A PREFERRED EMBODIMENT

Figure 1:
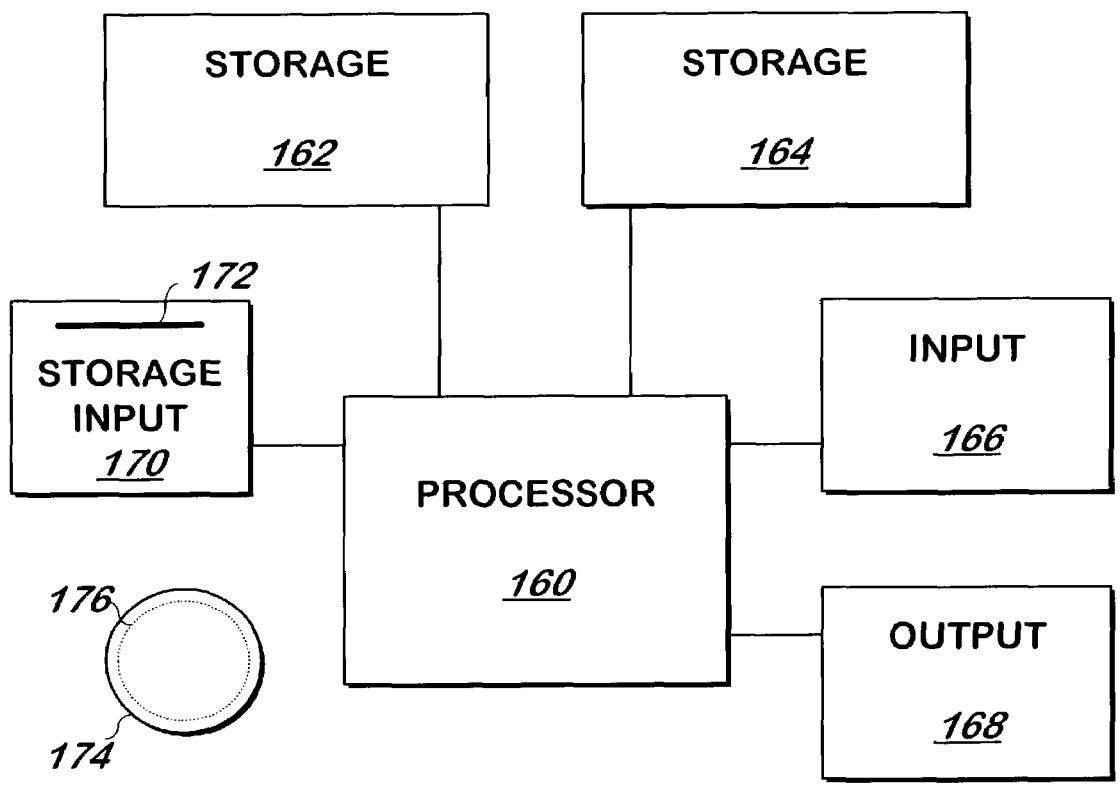
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Figure 2:
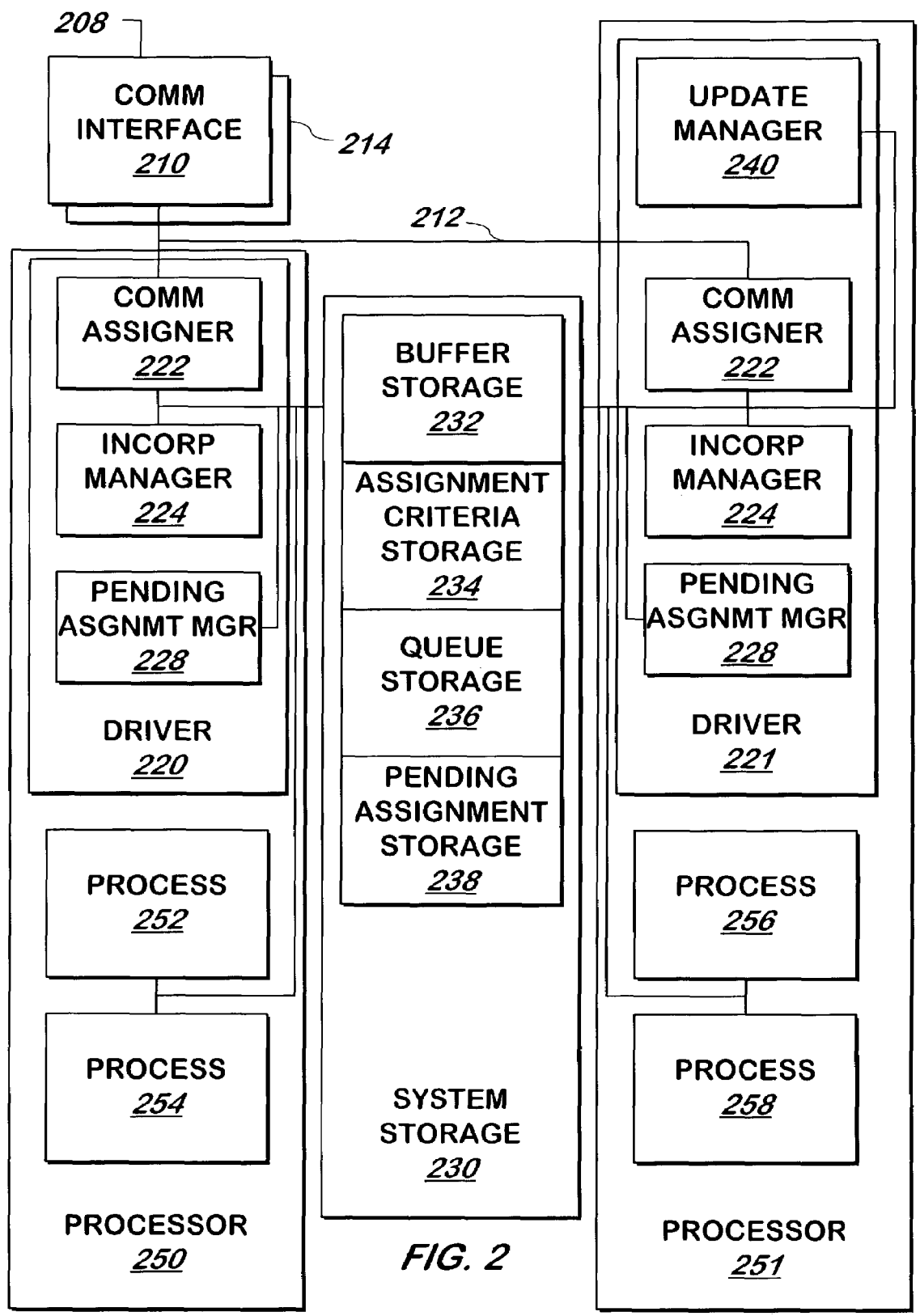
FIG. 2 is a block schematic diagram of a system for assigning communications in a multiprocessor system according to one embodiment of the present invention.

Referring now to FIG. 2 a block schematic diagram of system for assigning communications in a multiprocessor system is shown according to one embodiment of the present invention. In one embodiment, all communication into or out of system 200 is made via input/output 208 of communication interface 210 which is coupled to a network such as the Internet or a local area network or both. Communication interface 210 is a conventional communication interface that supports TCP/IP or other conventional communication protocols.

A Communication is Received and Stored

A communication is received by communication interface 210 and communication interface 210 stores the communication in a buffer in buffer storage 232. In one embodiment, buffer storage 232 is part of system storage 230, which is conventional disk storage or memory, and each buffer contains sufficient space to hold the largest possible communication that may be received. When communication interface 210 has completed storing the communication to a buffer in buffer storage 232, communication interface 210 places the address or index of the buffer into which the communication was stored into a specified storage location or queue, such as a storage location or queue within the address space of the communication interface 210 itself, and signals an interrupt on interrupt line 212. Processors 250-251 monitor the interrupt line 212, and one of the processors will be chosen to handle the interrupt, using any conventional multiprocessor interrupt processor selection technique, such as are described in U.S. Pat. No. 5,379,434 issued to DiBrino on Jan. 3, 1995. Two processors 250-251 are shown in FIG. 2, however, any number of processors in a multiprocessor system may be used by the present invention.

Each processor 250-251 contains a driver 220-221 to handle the interrupt. The processor 250-251 that responds to the interrupt does so by transferring control to the driver 220-221 on that processor. Each processor 250-251 also runs any number of processes 252-258 that receive and process communications, four such processes 252-258 being shown in the figure, two for each processor 250-251, although any number of processes may be used and the number of processes need not be the same for each processor 250-251. The processes 252-258 can be any conventional process, such as application programs and any other process capable of processing a received communication.

Communication Identifier Identifies the Entity to which the Communication should be Assigned Communication assigner 222 in the driver 220-221 that handles the interrupt, identifies the entity, such as a processor 250, 251, to which the communication should be assigned. In one embodiment communication assigner 222 can not only identify as the entity to which the communication should be assigned as a processor 250-251, but also may identify as the entity a process 252-258 on that processor 250-251, or identifies as the entity a type (corresponding to a type queue described below) of communications to be processed by the identified processor 250-251 as described in more detail below. The identification and subsequent assignment of a communication to a processor 250, 251, and optionally a specific process 252-258 or type, may be performed in any number of ways, some of which will now be described.

In one embodiment, to make the identification, communication assigner 222 retrieves from communication interface 210 the address or index of the buffer into which the communication was stored, reads from buffer storage 232 some or all of the header, or other portion, or all, of the communication using the address or index of the buffer it retrieves, and identifies a corresponding processor 250-251 and/or optionally, a process 252-258 or a type of communications to be processed by a processor 250-251, by performing a function on some or all of the bits in the header of the communication.

For example, if the communication is a TCP packet, communication assigner 222 may use the least significant bit of the destination IP address from the header of the communication as the most significant bit of a two-bit result and use the least significant bit of the destination port of the header of the communication as the least significant bit of the result, and then identify a process 252-258 to which the communication should be assigned based on the result. For example, if the result is 00, process 252 is identified as the entity to which the communication should be assigned, if the result is 01, process 254 is identified as the entity to which the communication should be assigned, if the result is 10, process 256 is identified as the entity to which the communication should be assigned, and if the result is 11, process 258 is identified as the entity to which the communication should be assigned.

A similar technique may be used to assign communications to processors 250-251 if it is not desirable to assign communications directly to processes. This may be because there are multiple processes on the same processor that can process a given communication, and pooling such communications for processing by any capable process can ensure that they are processed in a manner that more closely corresponds to the order in which they are received, while ensuring that any such process has access to the context information in the processor cache from processing prior communications. This can also allow the processes to retrieve communications using conventional operating system calls, provided that the communications identified for each processor are placed into a data structure compatible with the operating system. As an example of the manner in which a processor may be identified as the entity to which the communication is assigned, the two bits in the result described above may be exclusive-ored, and if result of the exclusive-or is 1, processor 250 is identified as the entity to which the communication should be assigned and if the result of the exclusive-or is 0, processor 251 is identified as the entity to which the communication should be assigned.

A similar technique may be used to identify communications as a type of communications to be processed by a given processor. The identification, and subsequent assignment of a communication to a type of communications to be processed by a certain processor allows assignment to processes that can process that type of communication, without assigning the communication to a specific process, so that it may be processed more closely to the order in which it was received. In addition, as described in more detail below, a process on a processor that processes communications of a given type may retrieve such communications directly from the data structure for that type and processor, without an intervening process or operating system to distribute communications to those processes that can process them. In the example above, if the result is 00, the communication is identified as being a first type on processor 250, if the result is 01, the communication is identified as being a second type on processor 250, if the result is 10, the communication is identified as being a first type on processor 251, and if the result is 11, the communication is identified as being a second type on processor 251. As described in more detail below, each type and processor has its own queue, and so the entity identified as the entity to which the communication should be assigned is the queue corresponding to the type and processor.

The above were representative functions used to identify as the entity to which the communication should be assigned as a process, processor or queue for a type of communication to be processed by a certain processor. However, in other embodiments, other functions of arbitrary complexity may be used on any portion of the header to assign the communication. For example, a hash function on any or all of the source and destination IP addresses and ports and the protocol may be used in place of assignment of bits as described above. The contents of the message may be used for the function and other information other than the TCP header, such as an IP header, or even the time of day or a random number or pseudo-random number may be used to identify the entity to use for assignment of the communication.

In other embodiments of the present invention, lookup tables and the like may be used in place of the function, or in addition to it. In one embodiment, the lookup table may be pre-stored in processor identifier storage 234. Each row in the lookup table may contain a criteria (for example source IP address and port, followed by destination address and port, followed by protocol, with don't care symbols as wildcards) that, can be compared to some or all of the communication or other information (e.g. date and time) to determine whether the communication corresponds to that row in the lookup table. Other information in each row of the lookup table can be used to identify a process, processor or type of communication to be processed by a processor, to which the communication should be assigned when the communication corresponds to the criteria in the row. For example, an identifier of a queue in queue storage (described below) corresponding to the processor, process or type queue in queue storage 236 (described below) to which the communication should be assigned if it corresponds to the criteria of the row may be stored as another column of the table. The lookup table may be supplied prefilled, read into assignment criteria storage 234 from a file at system startup by update manager 240, or may be filled in response to messages received from processes 252-258 or other processes as described in more detail below. Because the drivers 220-221 respond to interrupts, only one driver 220-221 will access the lookup table in assignment criteria storage 234 at a given time, and thus, drivers 220-221 may share a single lookup table, although in other embodiments, each driver 220-221 has its own lookup table, which may be a copy of the others, or may contain differences representing the preference for assigning communications to the processor 250-251 on which the driver 220-221 executes as described below.

Resolution Between Conflicting Entities

More complex functions may be performed on the communications received than those described above, some of which may not be mutually exclusive, or the criteria in the table entries may overlap. In such embodiment, the communication being assigned in the manner described herein may meet the criteria for any of several rows in the table.

In one such embodiment, communication assigner 222 may use an internally stored set of rules, such as to prefer assignment to the processor 250-251 on which the communication assigner 222 making the assignment runs, and to prefer assignment corresponding to a specific process 252-258 ahead of assignment for a type of communication, and to prefer such assignment for a type of communication ahead of assignment for the processor 250-251. To allow such preferences to be expressed, the type of entity to which the communication corresponding to the criteria will be assigned is stored with the criteria in assignment criteria storage 234 or it may be implied from the identifier of the queue to which the communication should be assigned. In one embodiment, ranges of process identifiers capable of being assigned to processes running on each processor 250-251 and identifiers of the processors 250-251 themselves may be stored in assignment criteria storage, and the table rows reference the processor identifiers and/or process identifiers to allow communication assigner 222 (which internally stores the identifier of the processor 250-251 on which it operates as described below) to assign communications in accordance with these internally stored preference rules. Each row in the table in assignment criteria storage 234 may contain a preference field that communication assigner 222 can use to resolve the criteria for multiple rows matching a communication. Remaining ties may be broken at random, round robin, or other conventional ways of breaking ties.

Assigning the Communication to a Queue Corresponding to the Entity Identified

After the assignment identification is made by communication assigner 222 as described above, in one embodiment, communication assigner 222 assigns the communication to a queue or other storage in queue storage 236 that corresponds to the entity identified. To assign a communication to a processor, a type of communications within a processor, or a process on a processor, the pointer to the communication is provided to the end of a corresponding queue in queue storage 236, which is a part of system storage 230. Queue storage 236, described in more detail below, contains queues for each processor in one embodiment, each process in another embodiment, or for each type of communication for a given processor, in still another embodiment. Another embodiment may employ any combination of these, for example, having one queue per process, and a queue for the processor to handle communications that do not meet the criteria for assignment to a particular process.

In one embodiment, queue storage 236 is composed of several queues. The head pointer and tail pointer for each queue is stored in one part of queue storage 236 and the contents of each queue are stored in a different part of queue storage 236. The pointers for queues of each type (e.g. process queues, processor queues and queues for communications designated as being of a certain type to be processed on a certain processor) can be stored together in a logical order such as the order of the identifier of the process, processor or type, so that an offset corresponding to the queue can be identified from the process, processor or type to which the communication should be assigned, identified as described above.

The offset from a base address of the queue into which the communication matching the criteria should be stored, is stored in the table entry or may be calculated using the result of the function. The address or offset may be a function of the type of queue (e.g. processes have one base address, processors have another and types of communications assigned to a processor have another base address). In the case of a processor or process, the identifier of the processor and process may be used to calculate the offset (e.g. every queue has two words: a head pointer and a tail pointer, and therefore, the address of the queue for processor 3 is the base address for processor queues+6 words). In the case of types, a type identifier may be provided by the application with the criteria, and the type identifier is used to calculate the offset in the manner described above for the processor identifier. In other embodiments, pending assignment manager 228 may provide the base address and offset from a base address for an unused queue that corresponds to the criteria received, in response to receipt of the criteria.

The address of the queue contains a head pointer and a tail pointer of the queue. Storage for the contents of the queue is also located in queue storage 236 at another location, with sufficient space for each queue based on the expected traffic for the type of queue or the various types of queues.

Although the description above describes the identification of the entity to which the communication should be assigned, and then the assignment of the communication to a queue corresponding to that entity, in one embodiment, the identification of the entity may be performed by identifying the queue corresponding to the entity. In such embodiment, the actual identity of the entity that corresponds to the queue need not be "known", as the queue acts as a surrogate for an identifier of the entity.

Processes can Control the Identification and Assignment Process by Supplying Rows to be Incorporated into the Table In one embodiment, each process 252-258 may instruct pending assignment manager 228 that it desires to handle communications meeting a certain criteria. For example, a process 252-258 may instruct pending assignment manager 228 in the driver 220-221 for the processor 250-251 on which the process 252-258 is running that it wishes to handle communications having a particular destination port and protocol by providing this criteria (for example, using the format of the criteria column of the table described above) and the identifier of the process, and an optional preference value as described above. Alternatively, a representative process 252-258 of a processor 250-251 may provide multiple rows of the table on behalf of other processes 252-258 running on that processor 250-251 to pending assignment manager 228 on the same processor 250-251 as the process supplying the information.

Pending assignment manager 228 stores the information at the end of a pending assignment criteria queue for that driver 220-221 in pending assignment storage 238, which contains one such queue for each driver 220-221. Because the processes 252-258 can provide this information at any time, including having one process 252-258 on each different processor 250-251 send such information simultaneously, the use of separate driver queues eliminates the requirement of a locking mechanism that would otherwise be required to prevent the simultaneous use of assignment criteria storage 234.

In one embodiment, a separate queue exists in pending assignment storage 238 for each process 252-258 or for each process 252-258 that may provide such information to pending assignment manager 228 to avoid locking requirements that could otherwise be necessary for the per-driver queues described above, to account for scheduling conflicts that could occur if another process interrupts the storage of the information into the per-driver queue. A locking mechanism may also be employed on the pending assignment criteria queue on the assumption that such a mechanism will not cause delays too frequently.

The information in pending assignment storage 238 may be transferred into assignment criteria storage 234 at a later time, in any of a number of different ways. In one embodiment, update manager 240 periodically halts the operation of drivers 220-221 to add the entries in all of the queues in pending assignment storage 238 to the lookup table in assignment criteria storage 234. At system shutdown, update manager 240 incorporates any pending entries from pending assignment storage 238 into the table or tables in assignment criteria storage 234 and then saves the table or tables into disk storage. At system startup, update manager 240 reads the file and stores the table contained therein into the table or tables in assignment criteria storage 234, and then installs the remainder of the drivers 220-221 to allow them to begin operating.

In embodiments in which there are multiple lookup tables in assignment criteria storage 234, update manager 240 may add the information from the entries in pending assignment storage 238 into all of the tables, or some of the tables, or may add one version into one or more tables and another version into one or more different tables (e.g. adding different preference values for each table to be used by the driver 220-221 running on the processor 250-251 corresponding to the queue to which the communication should be assigned so that communication assigner 222 need not use the type of the assignment to determine the preference as described above.

In another embodiment, entries from the queue corresponding to the driver (or the queues for the processes that provide information to that driver) in pending assignment storage 238 are incorporated into assignment criteria storage 234, during the operation of that driver. In such embodiment, after communication assigner 222 completes the assignment of a communication as described herein, it signals incorporation manager 224, which scans just the pending assignment queue or queues in pending assignment storage 238 which contains criteria and other information received from processes of the processor on which incorporation manager 224 is being executed, and updates in assignment criteria storage 234 the lookup table or tables used by all drivers 220-221 that share a communication resource with the driver containing that incorporation manager 224, before returning program control to the processor 250-251. Although this process only updates assignment criteria storage 234 with information from a single processor 250-251, as the other drivers 220-221 assign communications, they will use their pending assignment criteria queues to update the table or tables. Because only one driver 220-221 of the drivers that share a communication resource operates at any given time, contention for the table or tables in assignment criteria storage 234 used by those drivers is avoided, eliminating the need for a locking mechanism to prevent simultaneous access to the table or tables in assignment criteria storage 234. If the processor 250-251 will prioritize the driver ahead of any processes that operate on that processor 250-251, interference involving the pending criteria queues is eliminated, and thus, using this embodiment, updates may occur more frequently than would otherwise be possible if system initialization and periodic updates were the only time the pending criteria were applied to the table or tables.

Processes Retrieve Communications from an Operating System or Directly from a Queue, Bypassing the Operating System As described herein, the assignment of communications to processors, processes or types of communications for a processor are made without use of the operating system of the multiprocessor computer system.

In one embodiment, communications are assigned to processor queues as described above. In such embodiment, the operating system (not shown) running on each processor reads the processor queue and provides communications to processes 252-258 as if the processor queue was the queue from the communication interface 210. In such embodiment, communication assigner 222 can provide a software interrupt to the processor corresponding to the processor to which the communication was assigned, to simulate a communication interface providing such interrupt. In such embodiment, processes 252-258 request communications using conventional operating system calls such as socket calls, and the operating system may process them with little or no change to the code for processing communications received from a communication interface 210 in the conventional manner.

In another embodiment, each process 252-258 may retrieve communications corresponding to the pointers in the various queues in queue storage 236. A process 252-258 may retrieve a communication corresponding to a pointer in a queue corresponding to that process 252-258, without employing a locking capability because no other process will retrieve communications from that queue. A process 252-258 may retrieve a communication corresponding to a pointer in a queue corresponding to the processor 250-251 on which the process 252-258 runs. A process 252-258 may retrieve a communication corresponding to a pointer in a queue corresponding to the processor 250-251 on which the process 252-258 runs that also corresponds to a type of communication processed by that process. A locking mechanism may be used for the last two techniques, or a separate process may handle providing pointers to the communication from each such queue using queued requests for communications. A process 252-258 may retrieve a communication from any combination of the above, in other embodiments of the present invention. This arrangement can bypass the operating system (not shown) under which each of the processes 252-258 run, to receive and to provide communications to the processes 252-258.

No Locking Required

Because communication interface 210 provides only a single interrupt at a time, and each driver 220-221 has control of the processor 250-251 on which it resides during the time it is responding to the interrupt, there is no contention for the criteria in assignment criteria storage 234, and if internally stored functions are used in the communication assigners 222, contention for the criteria is eliminated. Because only one communication resource device interrupt will be processed at a time, contention among drivers for the queues in queue storage 236 is avoided as well.

Furthermore, because the processes 252-258 (or operating system) retrieve pointers to communications from the head of the queues in queue storage 236, and each driver 220-221 adds pointers to communications to the end of the queues in queue storage 236, there is no contention for the pointers to the queues in queue storage 236, other than a check, using the end of the queue, that the processes 252-258 make to verify that the queue is not empty. If, when a communication pointer is added to the end of a queue, the end of the queue pointer is updated after the pointer to the communication is written to the queue, and the end of queue pointer is not greater than a single data word, the memory bus contention controls will accommodate the contention issues between the drivers 250-251 and the processes 252-258 and eliminate the need for a locking mechanism dedicated to preventing contention for the queues in queue storage 236.

If there are multiple communication interfaces 210, 214 supplying communications to the various drivers 220-221, 214, if all of the communication interfaces 210-214 share a single interrupt, conventional interrupt contention controls will accommodate the contention issues.

Alternatively, the communication interfaces 210, 214 may be divided into pools of one or more communication interfaces 210, 214 (each pool referred to as a "communication resource") and each communication resource may share an interrupt, which is serviced by a set of one or more drivers. In one such embodiment, the drivers in the set assign communications in such a manner that they may only be processed by processes 252-258 operating on processors on which the drivers in the set execute.

Thus, unless otherwise noted, the present invention may operate to provide communications without the use of a locking mechanism that is specific to the queues in queue storage 236 or the lookup table or tables in assignment criteria storage 234. A locking mechanism is a mechanism in which processes and/or, drivers check the availability of a shared resource such as queues or other memory resources before using it to ensure that it is not being used by another process and/or driver. In the circumstance in which a locking mechanism indicates the shared resource is in use, the process or driver that checked the availability of the shared resource may have to sit idle and check it again, wasting processor cycles. Even if the shared resource is available, the requirement that the locking mechanism be checked each time can use significant processing resources not required by various embodiments of the present invention, which does not employ such a locking mechanism.

As such, communications are stored, assigned and provided to processes or queues by the present invention "sinelockingly", which means "without the use of a locking mechanism that is dedicated to the use of storage, and/or the assignment, and/or the providing, of communications received by a computer system". The memory bus contention mechanisms and interrupt contention mechanisms used as described above do not affect whether a communication is stored, assigned or provided to processes sinelockingly because they are not dedicated to such use: they have other uses.

Methods

Figure 3:
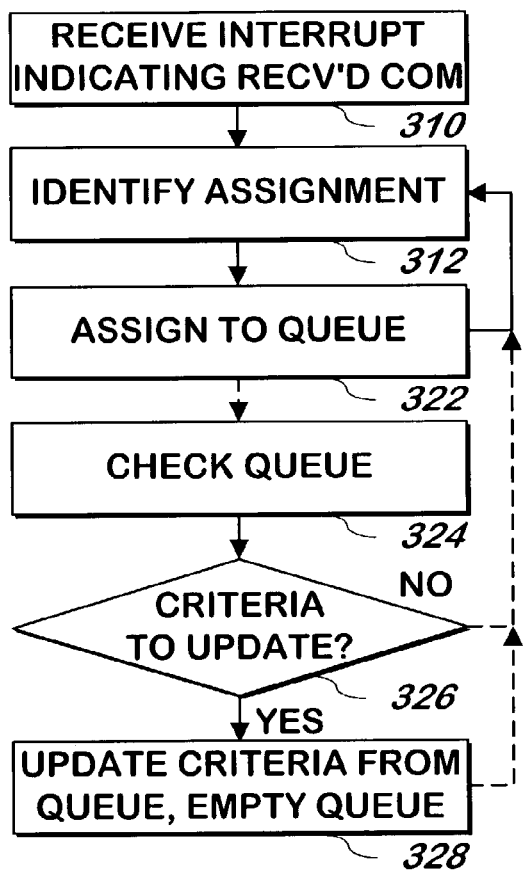
FIG. 3 is a flowchart illustrating a method of assigning communications in a multiprocessor system according to one embodiment of the present invention.

Referring now to FIG. 3, a method of assigning communications received is shown according to one embodiment of the present invention. Control is transferred in response to an interrupt received as described above 310.

An assignment is identified 312 from some or all of the communication as described above. The assignment may be identified using a calculation, or using a lookup table as described above to identify the entity or queue (corresponding to a process, processor or type of communication to be processed by a processor) to which the communication should be assigned. The method continues at step 322.

At step 322, the assignment identified in step 312 is made to a queue corresponding to a processor, process or type of communication on a processor and the method continues at step 310. Step 322 may include providing an interrupt to the processor corresponding to the queue to which the communication was assigned and other actions to simulate receipt of the communication for processing in a conventional fashion as described above.

In one embodiment, illustrated by the dashed lines in the Figure, instead of continuing at step 310, after step 322, a pending assignment criteria queue for the processor on which the method of FIG. 3 is being executed is checked 324. If there are pending assignment criteria in that queue 326, the criteria in that queue are applied to the criteria used to assign communications, the queue is set to empty 328 and the method continues at step 310.

Figure 4:
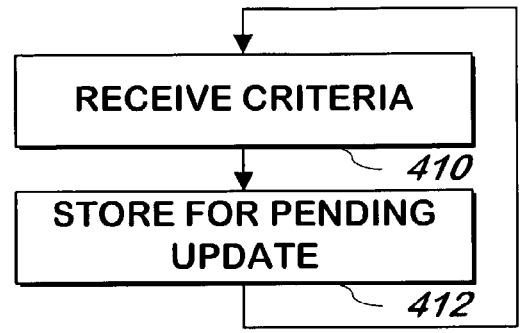
FIG. 4 is a flowchart illustrating a method of receiving criteria for communications from processes according to one embodiment of the present invention.

Referring now to FIG. 4, a method of receiving criteria from a process describing communications it can process is shown according to one embodiment of the present invention. The criteria, and an indication of the process or processor or a type to which communications meeting the criteria should be assigned is received 410. The information received in step 410 may include an indication that the process should be rescheduled for the processor on which the driver assigning the communication is operating, as described above. The criteria and other information are stored 412 into a pending assignment criteria queue or other storage device, awaiting incorporation into a set of criteria. Storage may be performed by converting the information received into one or more table entries as described above, including adding a preference value to the table entry for each such criteria for use as described above.

Figure 5:
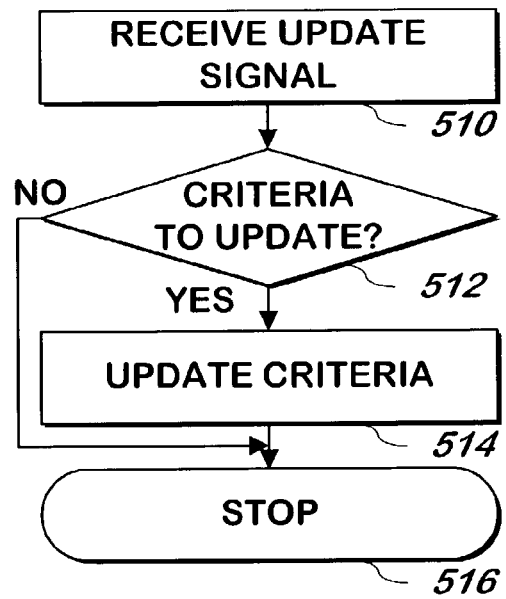
FIG. 5 is a flowchart illustrating a method of incorporating criteria received from processes into a set of criteria used to assign communications in a multiprocessor system according to one embodiment of the present invention.

Referring now to FIG. 5, a method of incorporating information received from processes into a set of criteria used to assign communications is shown according to one embodiment of the present invention. An update signal is received 510. The update signal may be received as a part of a system initialization or may be periodically performed as described above. If there are pending assignment criteria awaiting incorporation 512, the criteria and related information described above, such as an identifier of the processor, process, or type of communications assigned to a processor, preference information, and whether the assignment should be made to a process running on a processor on which the assignment is being made, are incorporated into the criteria used to assign communications 514 and the method continues at step 516. Otherwise 512, the method continues at step 516. At step 516, the method terminates.

What is claimed is:

1. A method for allocating a plurality of communications received at a communication interface having an address space, wherein each communication is a TCP packet, the method comprising:
 providing a plurality of processors coupled in a multiprocessor system configuration hosting an operating system wherein each processor is provided with a driver containing a communications assignor that is adapted to respond to an interrupt from the communication interface and each processor executes at least one process that receives and performs operations on communications;
 providing a system storage as part of the multiprocessor system that is configured into at least one buffer wherein the buffer is identifiable by an index and equipped to store at least one of the plurality of communications received at the communication interface;
 configuring at least one queue in the address space of the communication interface; and
 in response to a selected one of the plurality of communications being received at the communication interface, assigning the selected one of the plurality of communications to a selected one of the plurality of processors by:
  storing the selected one of the plurality of communications in the at least one buffer;
  placing the index identifying the at least one buffer into the at least one queue in the address space of the communication interface;
  signaling an interrupt to the plurality of processors in the multiprocessor system;
 transferring control to the driver associated with a selected processor from among the processors in the multiprocessor system;
 identifying an entity to assign the selected one of the plurality of received communications using the communication assignor contained in the driver associated with the selected processor by:
  providing a function adapted to return an indicia identifying the entity based upon a function call with at least a first portion of the communication;
  retrieving the index of the at least one buffer storing the selected one of the plurality of received communications from the communication interface;
  reading the first portion of the communication from the buffer storage using the retrieved index; and
  performing the function call on the first portion of the communication read from the buffer wherein the step of performing the function call includes the steps of:
   designating a least significant bit of a destination IP address from a header of the selected communication as a most significant bit of a two-bit result;
   designating the least significant bit of a destination port of the header of the selected communication as a least significant bit of the two-bit result; and
   returning the function call with the indicia set to the two-bit result to identify the entity to which the selected communication should be assigned based on the result; and
 assigning the selected communication to the entity for processing by the entity.

2. A method for allocating a plurality of communications received at a communication interface having an address space, wherein each communication is a TCP packet, the method comprising:
 providing a plurality of processors coupled in a multiprocessor system configuration hosting an operating system wherein each processor is provided with a driver containing a communications assignor that is adapted to respond to an interrupt from the communication interface and each processor executes at least one process that receives and performs operations on communications;
 providing a system storage as part of the multiprocessor system that is configured into at least one buffer wherein the buffer is identifiable by an index and equipped to store at least one of the plurality of communications received at the communication interface;
 configuring at least one queue in the address space of the communication interface; and
 in response to a selected one of the plurality of communications being received at the communication interface, assigning the selected one of the plurality of communications to a selected one of the plurality of processors by:
  storing the selected one of the plurality of communications in the at least one buffer;
  placing the index identifying the at least one buffer into the at least one queue in the address space of the communication interface;
  signaling an interrupt to the plurality of processors in the multiprocessor system;

transferring control to the driver associated with a selected processor from among the processors in the multiprocessor system;
identifying an entity to assign the selected one of the plurality of received communications using the communication assignor contained in the driver associated with the selected processor by:
providing a function adapted to return an indicia identifying the entity based upon a function call with at least a first portion of the communication;
retrieving the index of the at least one buffer storing the selected one of the plurality of received communications from the communication interface;
reading the first portion of the communication from the buffer storage using the retrieved index; and
performing the function call on the first portion of the communication read from the buffer wherein the step of performing the function call includes the steps of:
designating a least significant bit of a destination IP address from a header of the selected communication as a most significant bit of a two-bit result;
designating the least significant bit of a destination port of the header of the selected communication as a least significant bit of the two-bit result; and
returning the function call with the indicia set to the two-bit result to identify the entity to which the selected communication should be assigned based on the result; and
assigning the selected communication to the entity for processing by the entity wherein the entity is selected from the group consisting of a processor, a specific process and a type.

3. A method for allocating a plurality of communications received at a communication interface having an address space, the method comprising:
providing a plurality of processors coupled in a multiprocessor system configuration hosting an operating system wherein each processor is provided with a driver containing a communications assignor that is adapted to respond to an interrupt from the communication interface and each processor executes at least one process that receives and performs operations on communications;
providing a system storage as part of the multiprocessor system that is configured into at least one buffer wherein the buffer is identifiable by an index and equipped to store at least one of the plurality of communications received at the communication interface;
configuring at least one queue in the address space of the communication interface, wherein a portion of the address space of the communication interface is designated for queue storage and contains at least one queue for each processor in the plurality of processors, queues for each process and queues for each type of communication designated for processing on each processor in the plurality of processors wherein each queue is associated with a head pointer, a tail pointer and queue contents, the queue being characterized in that the head pointer and tail pointer are stored in a first part of the queue storage and the queue contents are stored in a second part of the queue storage that is noncontiguous with the first part of the queue storage; and
in response to a selected one of the plurality of communications being received at the communication interface, assigning the selected one of the plurality of communications to a selected one of the plurality of processors by:
storing the selected one of the plurality of communications in the at least one buffer;
placing the index identifying the at least one buffer into the at least one queue in the address space of the communication interface;
signaling an interrupt to the plurality of processors in the multiprocessor system;
transferring control to the driver associated with a selected processor from among the processors in the multiprocessor system;
identifying an entity to assign the selected one of the plurality of received communications using the communication assignor contained in the driver associated with the selected processor; and
assigning the selected communication to the entity for processing by the entity;
wherein the pointers for queues of each type of communication associated with each processor in the plurality of processors are stored in a logical order selected from the set consisting of:
an order of an identifier of the process, an order of an identifier of the processor, an order of an identifier of the type or any combination thereof so as to permit the determination of an offset from a base address of a selected queue corresponding to at least one of the identified process, processor and type.

4. A method for allocating a plurality of communications received at a communication interface having an address space, the method comprising:
providing a plurality of processors coupled in a multiprocessor system configuration hosting an operating system wherein each processor is provided with a driver containing a communications assignor that is adapted to respond to an interrupt from the communication interface and each processor executes at least one process that receives and performs operations on communications;
providing a system storage as part of the multiprocessor system that is configured into at least one buffer wherein the buffer is identifiable by an index and equipped to store at least one of the plurality of communications received at the communication interface;
configuring at least one queue in the address space of the communication interface, wherein a portion of the address space of the communication interface is designated for queue storage and contains at least one queue for each processor in the plurality of processors, queues for each process and queues for each type of communication designated for processing on each processor in the plurality of processors wherein each queue is associated with a head pointer, a tail pointer and queue contents, the queue being characterized in that the head pointer and tail pointer are stored in a first part of the queue storage and the queue contents are stored in a second part of the queue storage that is noncontiguous with the first part of the queue storage; and
in response to a selected one of the plurality of communications being received at the communication interface, assigning the selected one of the plurality of communications to a selected one of the plurality of processors by:

storing the selected one of the plurality of communications in the at least one buffer;

placing the index identifying the at least one buffer into the at least one queue in the address space of the communication interface;

signaling an interrupt to the plurality of processors in the multiprocessor system;

transferring control to the driver associated with a selected processor from among the processors in the multiprocessor system;

identifying an entity to assign the selected one of the plurality of received communications using the communication assignor contained in the driver associated with the selected processor; and assigning the selected communication to the entity for processing by the entity;

wherein the pointers for queues of each type of communication associated with each processor in the plurality of processors are stored in a logical order selected from the set consisting of: an order of an identifier of the process, an order of an identifier of the processor, an order of an identifier of the type or any combination thereof so as to permit the determination of an offset from a base address of a selected queue corresponding to at least one of the identified process, processor and type wherein the offset is stored in an entry of a lookup table calculated using a function call.

5. A method for allocating a plurality of communications received at a communication interface having an address space, the method comprising:

providing a plurality of processors coupled in a multiprocessor system configuration hosting an operating system wherein each processor is provided with a driver containing a communications assignor that is adapted to respond to an interrupt from the communication interface and each processor executes at least one process that receives and performs operations on communications;

providing a system storage as part of the multiprocessor system that is configured into at least one buffer wherein the buffer is identifiable by an index and equipped to store at least one of the plurality of communications received at the communication interface;

configuring at least one queue in the address space of the communication interface; and in response to a selected one of the plurality of communications being received at the communication interface, assigning the selected one of the plurality of communications to a selected one of the plurality of processors by:

storing the selected one of the plurality of communications in the at least one buffer;

placing the index identifying the at least one buffer into the at least one queue in the address space of the communication interface;

signaling an interrupt to the plurality of processors in the multiprocessor system;

transferring control to the driver associated with a selected processor from among the processors in the multiprocessor system;

identifying an entity to assign the selected one of the plurality of received communications using the communication assignor contained in the driver associated with the selected processor; and assigning the selected communication to the entity for processing by the entity by:

configuring the system storage with a pending assignment storage;

providing a pending assignment manager on the driver of each processor, the pending assignment manager configured for data communication with the communications assignor and the pending assignment storage;

placing an update manager into operative communication with the buffer storage; configuring at least one pending assignment criteria queue in the pending assignment storage for each driver;

without use of a locking mechanism to prevent concurrent use of the assignment criteria storage, causing a process to instruct the pending assignment manager in the driver for the selected processor on which the process is running that the process will handle communications having a selected destination port and protocol by providing the at least one pending assignment criteria;

at periodic intervals causing the update manager to halt operation of the drivers and add entries in the at least one pending assignment criteria queue in the pending assignment storage to the lookup table in assignment criteria storage independently of the operating system of the multiprocessor system wherein the lookup table maps the selected communication to the entity.

* * * * *